(12) United States Patent
Hsu et al.

(10) Patent No.: US 11,703,986 B1
(45) Date of Patent: Jul. 18, 2023

(54) TOUCH DETECTION USING RADAR

(71) Applicant: Amazon Technologies, Inc., Seattle, WA (US)

(72) Inventors: Morris Yuanhsiang Hsu, Mountain View, CA (US); Durgaprasad Kashinath Shamain, Los Gatos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/546,787

(22) Filed: Dec. 9, 2021

(51) Int. Cl.
  *G06F 3/046* (2006.01)
  *G06F 3/041* (2006.01)
(52) U.S. Cl.
  CPC ............ *G06F 3/046* (2013.01); *G06F 3/0412* (2013.01)
(58) Field of Classification Search
  CPC ................................ G06F 3/046; G06F 3/0412
  See application file for complete search history.

(56) References Cited

U.S. PATENT DOCUMENTS

| 2012/0092284 A1* | 4/2012 | Rofougaran | ............ G06F 3/017 345/173 |
| 2014/0132566 A1* | 5/2014 | Hsieh | .................... G06F 3/0425 345/175 |

\* cited by examiner

*Primary Examiner* — Lisa S Landis
(74) *Attorney, Agent, or Firm* — Lowenstein Sandler LLP

(57) ABSTRACT

Technologies for detecting touch events on, or hover events above, a surface of an electronic device using radar units instead of integrated capacitive touch sensing technologies, are described. An electronic device includes a display located along a first plane. The electronic further includes a first radar unit coupled to the display. The first radar unit is oriented and comprises a first field-of-view (FoV) along a portion of the first plane. The electronic device further includes a processor coupled to the first radar unit. From the first radar unit, the processor receives first data that indicates a first object detection corresponding to a first location. The processor further determines, using the first data, a touch event associated with the display.

20 Claims, 13 Drawing Sheets

TOUCH DETECTION USING RADAR

BACKGROUND

A large and growing population of users is enjoying entertainment through the consumption of digital media items, such as music, movies, images, electronic books, and so on. The users employ various electronic devices to consume such media items. These electronic devices (referred to herein as endpoint devices, user devices, clients, client devices, or user equipment) are electronic book readers, cellular telephones, personal digital assistants (PDAs), portable media players, tablet computers, netbooks, laptops, and the like. These electronic devices wirelessly communicate with a communications infrastructure to enable the consumption of digital media items. To wirelessly communicate with other devices, these electronic devices include one or more antennas.

The electronic devices often include a touch screen that displays data or information to the user and receives user input from the user. For example, a user may watch a digital video or view a website using the touch screen. In another example, the user may select an icon or input text using the touch screen. The users may use touch objects (e.g., a finger, a stylus, etc.) to provide the user input to the touch screen.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
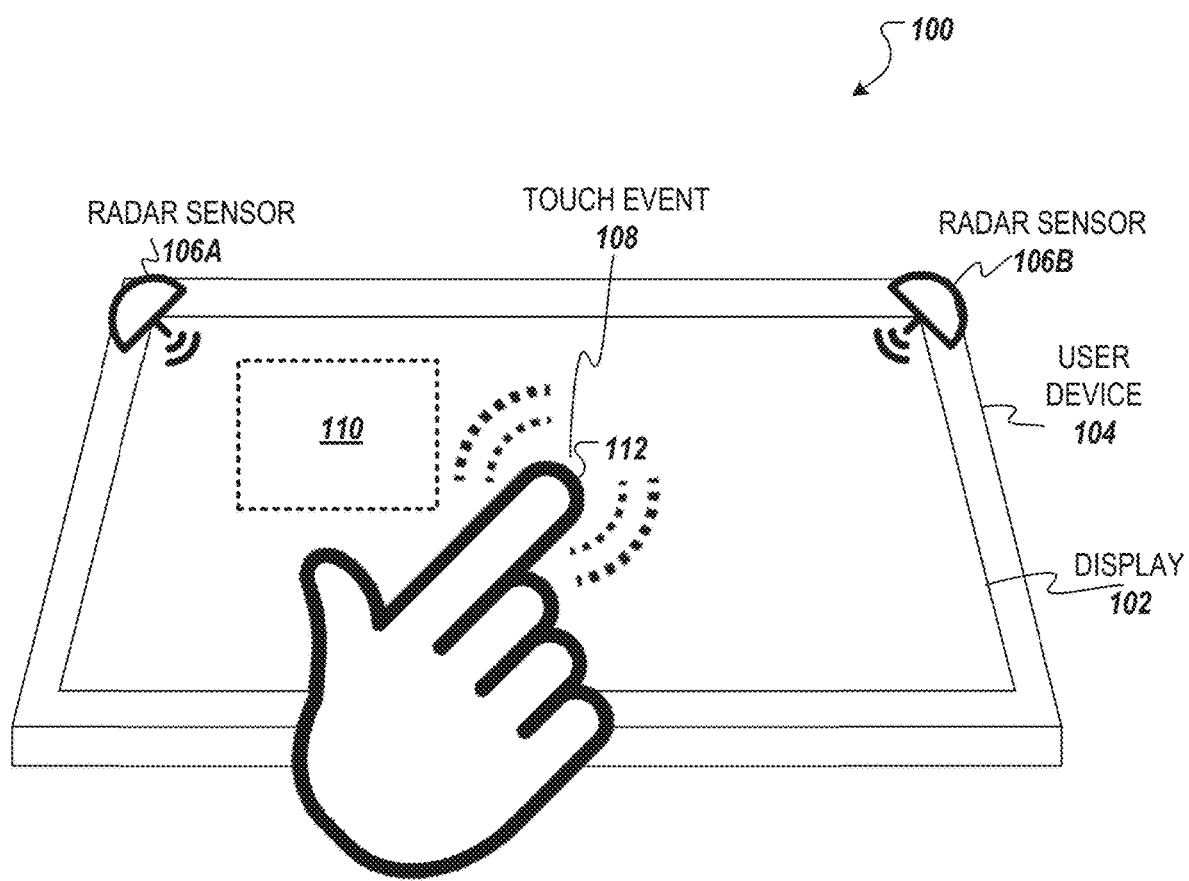
FIG. 1 illustrates a touch detection system using radar sensors to detect a touch event on or proximate to a display of a user device, according to at least one embodiment.

Technologies for detecting touch events on, or hover events above, a surface of an electronic device using radar units instead of integrated capacitive touch sensing technologies, are described. Conventional integrated capacitive touch sensing technologies can be used in touch panels, touch screens, or the like. Conventional touch screens use a touch panel that is integrated with the display. The touch panel is an input device that generates a signal corresponding to a position when an object such as a finger or a pen is touched. The touch screen panel is used in various fields such as consumer devices, industrial devices, medical devices, appliance devices, or the like. Conventional touch technologies detect touches by measuring the capacitances of the touch panel.

Conventional touch technologies can significantly increase in cost as the screen dimensions increase, especially in devices with screens larger than five inches. The cost increases because of the increased amount of circuitry and components needed to operate the touch panel and the increased complexity of control circuitry needed to operate the touch screen. The increased cost of the touch screen dimensions becomes a significant contributor to the cost of the device.

Aspects of the present disclosure address the above and other deficiencies and others by providing two or more radar units (e.g., mmWave radar sensors) at corners of a surface of a device to detect touch events on, and hover events above, the surface of the device. Radar, also referred to as radio detection and ranging, is a detection system that uses radio waves to determine a distance (ranging), an angle, and/or a velocity of one or more objects. A radar unit includes a transmitter that produces electromagnetic waves in the radio or microwave domain and one or more receivers to measure electromagnetic waves reflected off an object. A radar unit can also be referred to as a radar sensor or a radar device. Although sometimes referred to as radar sensor, it should be noted that a radar sensor has both a transmitter and one or more receivers to transmit a radar signal (radio waves) and receive or measures the reflected signals (reflected waves) from the radar signal encountering an object. The radio waves (pulsed or continuous) from the transmitter and reflected off the object given information about the object's location and speed. Aspects of the present disclosure can also be used with other sensing systems, such as an ultrasound unit. A sensing system can include at least one transmitter to transmit sound or electromagnetic waves and at least one receiver to measure reflected waves to determine a distance value between the sensing system and an object and an angle value between the sensing system and the object. An ultrasound unit can measure distance and angle and a radar unit can measure distance, angle, and velocity. The sensing system is oriented to direct a field-of-view (FoV) at or across the surface. A processing device, using at least the distance value and the angle value, detects a touch event on, or proximate to, the surface by the object. The processing device can also use velocity measured by the sensing system to detect the touch event and/or a gesture event. Aspects of the present disclosure can provide touch detection capabilities where the cost does not scale with detection dimensions. Aspects of the present disclosure can provide touch detection in connection with a display where two radar sensors are located on two corners of the display.

Each radar sensor is pointed towards a corner diagonally across the display. In this configuration, the radar sensors have a line of sight (LoS) to fingers touching anywhere on the display. Also, because a radar sensor has a cone-shape field-of-view (FoV) coming out from the front of the radar sensor, the radar sensor can detect air gestures at a short distance away from the display. These air gestures can be characterized as either touch events or hover events.

In at least one embodiment, an electronic device includes a first radar sensor coupled to the display. The first radar sensor is oriented to direct a first FoV across a surface of the display. In at least one embodiment, the first radar sensor is oriented on a plane perpendicular to the display. In other embodiments, the first radar sensor is oriented at other angles such that the first FoV covers the display. The electronic device further includes a processor coupled to the first radar sensor. From the first radar sensor, the processor receives first data that indicates a first object detection corresponding to a first location. The processor further determines, using the first data, a touch event associated with the display.

FIG. 1 illustrates a touch detection system 100 using radar sensors 106 to detect a touch event 108 on or proximate to a display 102 of a user device 104, according to at least one embodiment. The touch detection system 100 includes a first radar sensor 106A, a second radar sensor 106B, and processing logic in a processing device 110. The first radar sensor 106A is disposed at a first corner between a first edge of the display 102 and a second edge of the display 102. A surface of the display 102 is disposed along a first plane. The first radar sensor 106A is oriented at an angle from the first plane of the display 102 to direct a first FoV across a surface of the display 102. The second radar sensor 106B is disposed at a second corner between the first edge and a third edge of the display 102. The second radar sensor 106B is orientated at the angle from the first plane to direct a second FoV across the surface of the display 102. The first FoV and the second FoV intersect to cover at least most of the display 102. The two radar sensors are located on the two corners of the display 102, and each points diagonally across the surface of the display 102 to opposite corners. In this configuration, the radar sensors have a line of sight (LoS) to fingers touching anywhere on the surface of the display 102. It should be noted that because radar sensors have a cone-shape FOV coming out from a front of the radar sensor, the radar sensor can detect air gestures at a short distance away from the display 102.

In at least one embodiment, the radar sensors 106 are mmWave radar sensors. However, instead of pointing the radar sensor towards a user to detect an air gesture, the radar sensors 106 are pointed to cover the surface of the display 102. The processing device 104 is coupled to the first radar sensor 106A and the second radar sensor 106B. In at least one embodiment, the first radar sensor 106A includes one transmitter and three receivers, also referred to as a 1T3R radar sensor. The 1T3R radar sensor can provide a range (r) (i.e., a distance value), velocity information (v) in a range axis, azimuth angle ($\theta$), and elevation angle ($\varphi$) of the object(s) detected. The range information from the two radar sensors 106 can be used as primary inputs to map the range information to two-dimensional (2D) coordinates (x-y coordinates in an x-y plane) for the touch location. This is referred to as 2D localization. The azimuth angle ($\theta$), which is less precise than the range, can improve accuracy and provide a way to map two fingers on the display 102. Existing gesture algorithms can be leveraged to detect swipes, tap, zoom, or the like with touch locations identified.

In at least one embodiment, the touch detection system 100 can detect swipe gestures in four directions (also referred to as four-way swipes (up, down, left, right), tap events, two-dimensional localization of a finger, such as for an on-screen keyboard, drag and drop gestures, or the like.

During operation, the processing device 110 receives first data from the first radar sensor 106A and second data from the second radar sensor 106B. The first data identifies i) a first distance between the first radar sensor 106A and an object 112 (e.g., a finger) and ii) a first angle in the first plane between the first edge and a first axis extending from the object 112 to the first radar sensor 106A (e.g., first corner), the first angle corresponding to a second distance from one of the first edge or the second edge to the object 112. The second data identifies i) a third distance between the second radar sensor 106B and the object 112, and ii) a second angle in the first plane between the first edge and a second axis extending from the object 112 to the second radar sensor 106B (e.g., second corner), the second angle corresponding to a fourth distance from one of the first edge or the third edge to the object 112. The processing device 110 determines a position of the object 112 using the first data and the second data. The processing device 110 determines two-dimensional (2D) coordinates of a location of the object 112 using the first data and the second data. The 2D coordinates identify a point or a position on the display 102 where the touch event 108 is located. The processing device 110 stores or outputs an indication of the touch event 108, including the 2D coordinates. The touch event can be a touch input at the determined location. The 2D coordinates can correspond to a location on an on-screen keyboard being displayed on the display 102.

As described herein, radar FoV forms a cone and not a ray, so any objects approaching the display 102, but not touching the surface can be detected as well. This may lead to erroneous x-y coordinate mapping. The processing device 110 can use the elevation information to reject any detections above a certain threshold (e.g., 8 degrees). The threshold can be an angle value that corresponds to a distance or height above the surface. For example, the threshold can be set to 8 degrees for a 15.6" display. The 8 degrees can translate to a distance of 45 mm above the display 102 at the bottom center of the display 102. The distance can be considered a detection threshold. Objects detected at or lower than the detection threshold can be considered a touch event, and objects detected higher than the detection threshold can be rejected.

In some cases, hover events can be detected up to a certain height above the surface. In some cases, hover events are treated the same as touch events. In other cases, different responses can be performed in response to hover events and touch events. Two thresholds can be used in some cases— one threshold for touch events and one threshold for hover events. In some embodiments, plastic lenses can be used on the radar sensors, and the plastic lenses can narrow the elevation beam width if necessary.

In a further embodiment, the first data further identifies iii) a third angle between the surface and a third axis extending from the object 112 to the first radar sensor, corresponding to a first elevation distance of the object 112 above the first plane of the display 102. The second data further identifies iii) a fourth angle between the surface and a fourth axis extending from the object 112 to the second radar sensor, corresponding to a second elevation distance of the object 112 above the first plane of the display 102. The processing device 110 detects the touch event 108 responsive to a determination that the third and fourth angles are less than an angle threshold (e.g., 8 degrees), representing a maximum distance above the surface where an object is associated with a touch input. The specified degree of the angle threshold can correspond to a maximum distance above (or a height above) the surface where an object is considered a touch event if detected. An object detected above the maximum distance would be rejected as a touch event, ignored, discarded, or the like. In some cases, the object 112 can be tracked as it approaches the maximum distance and then triggers a touch event 108 once the maximum distance is reached.

In at least one embodiment, a single radar sensor can be used. The single radar sensor is pointed so that the FoV includes the surface of the display 102. The elevation information can be used to reject objects detected above the angle threshold and detect touch events of objects detected within the angle threshold. In other embodiments, more than two radar sensors can be used. The processing device 110 can use information from each sensor to improve accuracy, provide redundancy, differentiate between multiple objects, or the like.

In at least one embodiment, the first data includes first velocity information, and the second data includes second velocity information. The processing device 110 receives third data from the first radar sensor 106A and fourth data from the second radar sensor 106B. The third data identifies i) a fifth distance between the first radar sensor 106A and the second object (not illustrated in FIG. 1), ii) a third angle between the first edge and a third axis extending from the second object to the first radar sensor 106A, the third angle corresponding to a sixth distance from one of the first edge or the second edge, and iii) third velocity information of the second object. The fourth data identifies i) a seventh distance between the second radar sensor 106B and the second object; ii) a fourth angle in the first plane between the first edge and a fourth axis extending from the second object to the second radar sensor 106B, the fourth angle corresponding to an eighth distance from one of the first edge or the third edge, and iii) fourth velocity information of the second object. The processing device 110 determines a second location of the second object using the third data and the fourth data. The processing device 110 determines second 2D coordinates of the second location of the second object on the display 102. The two objects can be detected as separate touch events. The two objects can also be tracked over time to determine a gesture event associated with the display 102 using the first, second, third, and fourth data. The gesture event can be a swipe motion event, a pinch motion event, or a multi-touch event.

In another embodiment, the first data includes first velocity information, and the second data includes second velocity information. The processing device 110 determines, using the first radar unit, third velocity information of a second object. The processing device 110 determines, using the second radar unit, fourth velocity information of the second object. The processing device 110 determines a gesture event associated with the display using the first velocity information, the second velocity information, the third velocity information, and the fourth velocity information, wherein the gesture event corresponds to at least one of a swipe motion event, a pinch motion event, or a multi-touch event.

Figure 2A:
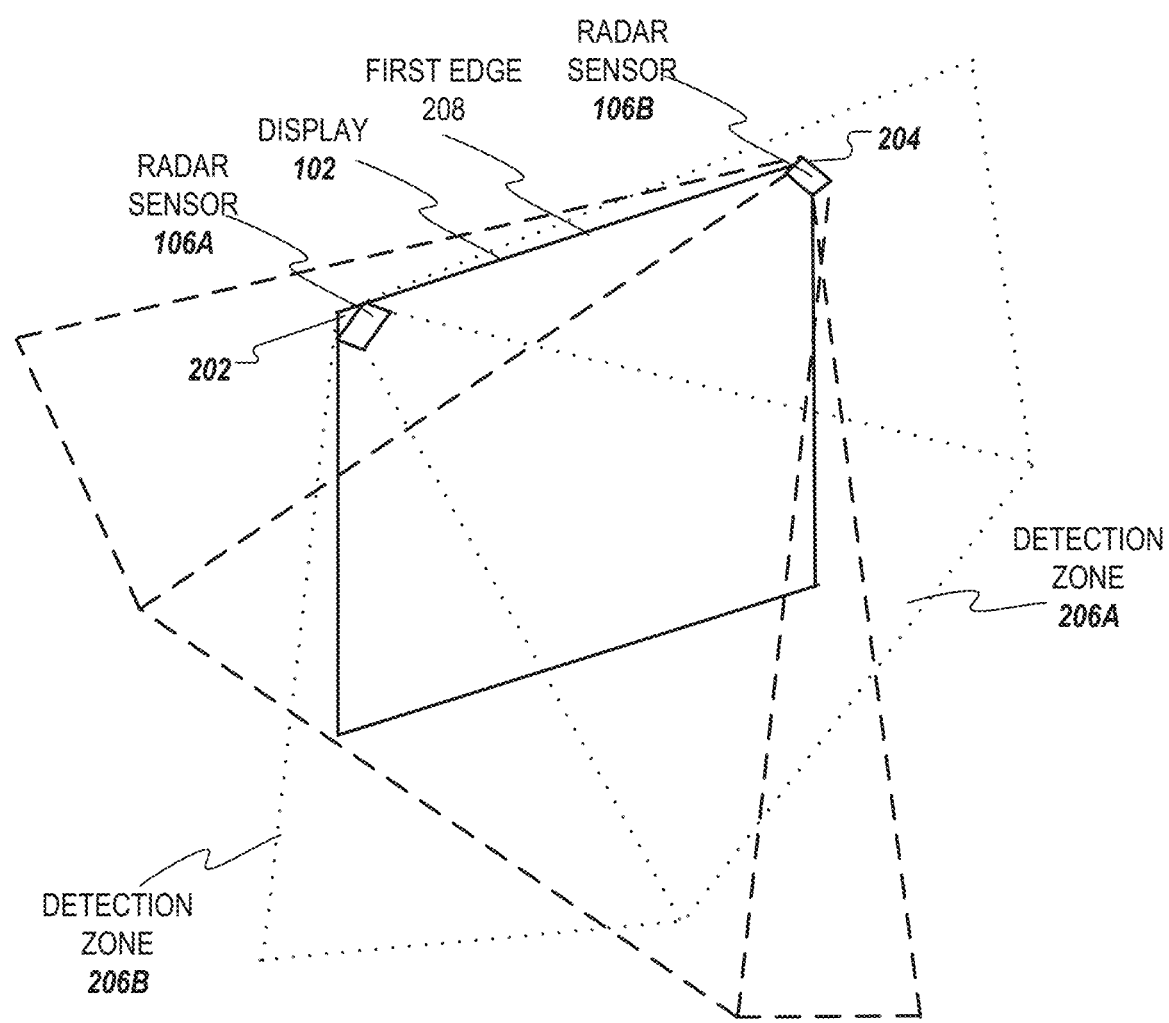
FIG. 2A depicts two overlapping detection zones above a surface of the display of FIG. 1 according to at least one embodiment.

FIG. 2A depicts two overlapping detection zones above a surface of the display 102 of FIG. 1 according to at least one embodiment. The first radar sensor 106A is located at a first corner 202 of the display 102 and is oriented at an angle above a first plane of the surface such that the surface is in a first FoV of the first radar sensor 106A. In at least one embodiment, the first radar sensor 106A is oriented at an angle above the first plane by being placed in a raised bezel. In at least one embodiment, the radar sensor is 6.5×5 mm in size. In at least one embodiment, the raised bezel can have a height to accommodate the radar sensor in a bezel surface perpendicular to the display 102. Alternatively, the radar sensor can be tilted instead of perpendicular to the display 102. A raised bezel of less height (e.g., a few mm) can be used in this embodiment. The first radar sensor 106A is pointed diagonally towards the center of the display 102 so that the first FoV creates a first detection zone 206A. The first radar sensor 106 can detect an object on, or proximate to, the surface of the display 102. The second radar sensor 106B is located at a second corner 204 of the display 102 and is oriented at the angle above the first plane of the surface such that the surface is in a second FoV of the second radar sensor 106B. The second radar sensor 106B is pointed diagonally towards the center of the display 102 so that the second FoV creates a second detection zone 206B. The first corner 202 and the second corner 204 are located at the corners of a first edge 208 of the display 102. It should be noted that although the first and second detection zones 206A, 206B are illustrated with straight lines for simplicity (different hashed lines for the two zones), the first and second detection zones 206A, 206B have partial conical shapes above the surface of the display 102. As described herein, the elevation information determined by the radar sensors 106 can be used to detect touch events by the object(s) being on the surface or within a corresponding distance from the surface.

In another embodiment, air gestures can also be detected in addition to detecting touch events at or proximate to the display 102. Since the radar FOV can still cover tens of centimeters away from the display 102, air gestures can also be supported. The air gestures can include left/right air swipes, tapping the air with palm, or the like. This configuration can be useful for placement near appliances or industrial equipment where an operator's hands may be wet or dirty. Also, with the radar sensor tilted into the display 102, the reflection from the display 102 can be leveraged for longer-range use cases such as presence, tracking, vitals detection, or the like.

Figure 2B:
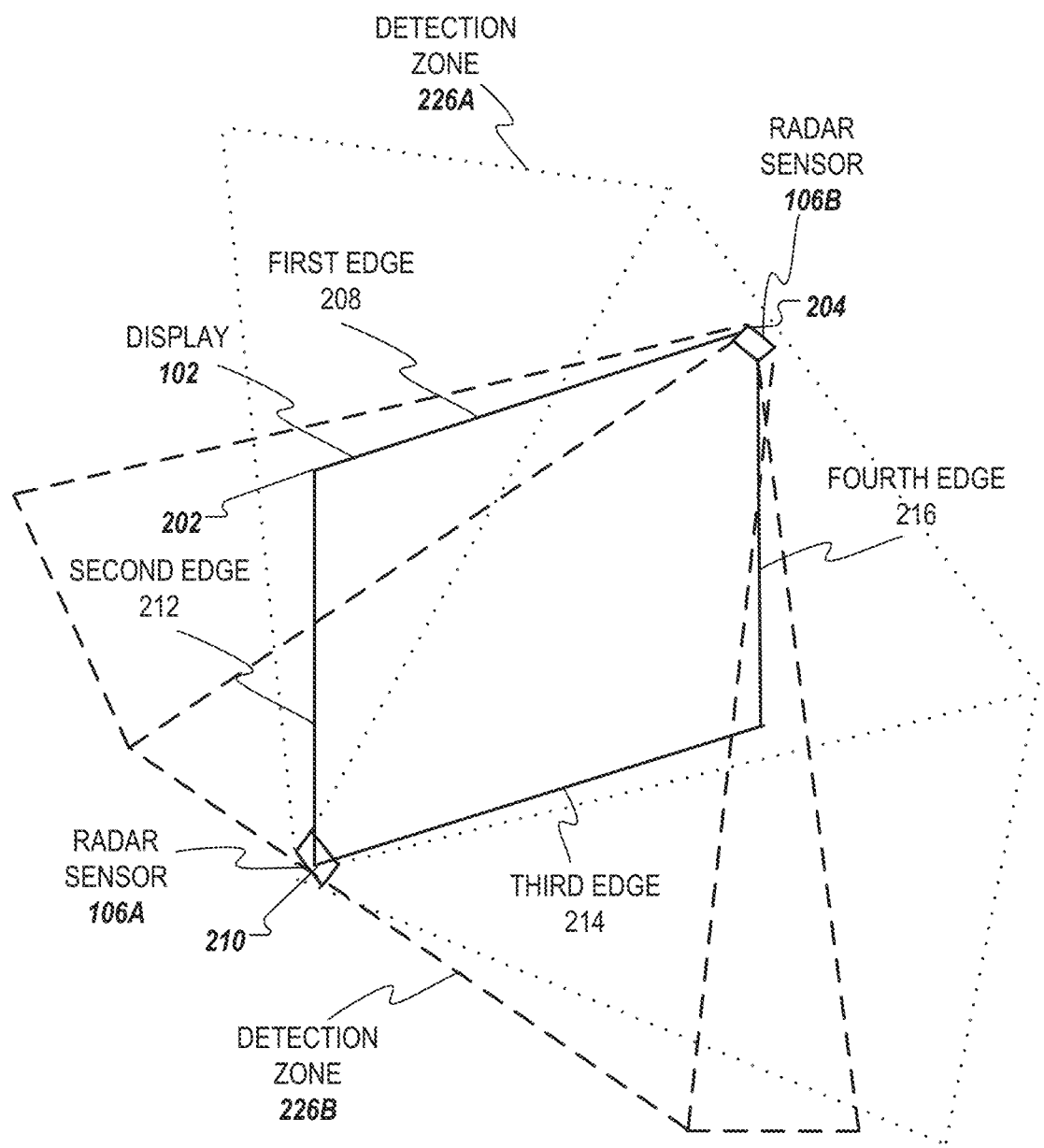
FIG. 2B depicts two overlapping detection zones above a surface of the display of FIG. 1 according to at least one embodiment.

FIG. 2B depicts two overlapping detection zones above a surface of the display of FIG. 1 according to at least one embodiment. The first radar sensor 106A is located at a third corner 210 of the display 102 and is oriented at an angle above a first plane of the surface such that the surface is in a first FoV of the first radar sensor 106A. The first radar sensor 106A is pointed diagonally towards a center of the display 102 so that the first FoV creates a first detection zone 226A. The first radar sensor 106 can detect an object on, or proximate to, the surface of the display 102. The second radar sensor 106B is located at a second corner 204 of the display 102 and is oriented at the angle above the first plane of the surface such that the surface is in a second FoV of the second radar sensor 106B. The second radar sensor 106B is pointed diagonally towards the center of the display 102 so that the second FoV creates a second detection zone 226B. The third corner 2102, and the second corner 204 are opposite corners of the display 102. In particular, the third corner 210 is located at an intersection of a second edge 212 and a third edge 214. The second corner 204 is located at an intersection of the first edge 208 and a fourth edge 216.

Figure 2C:
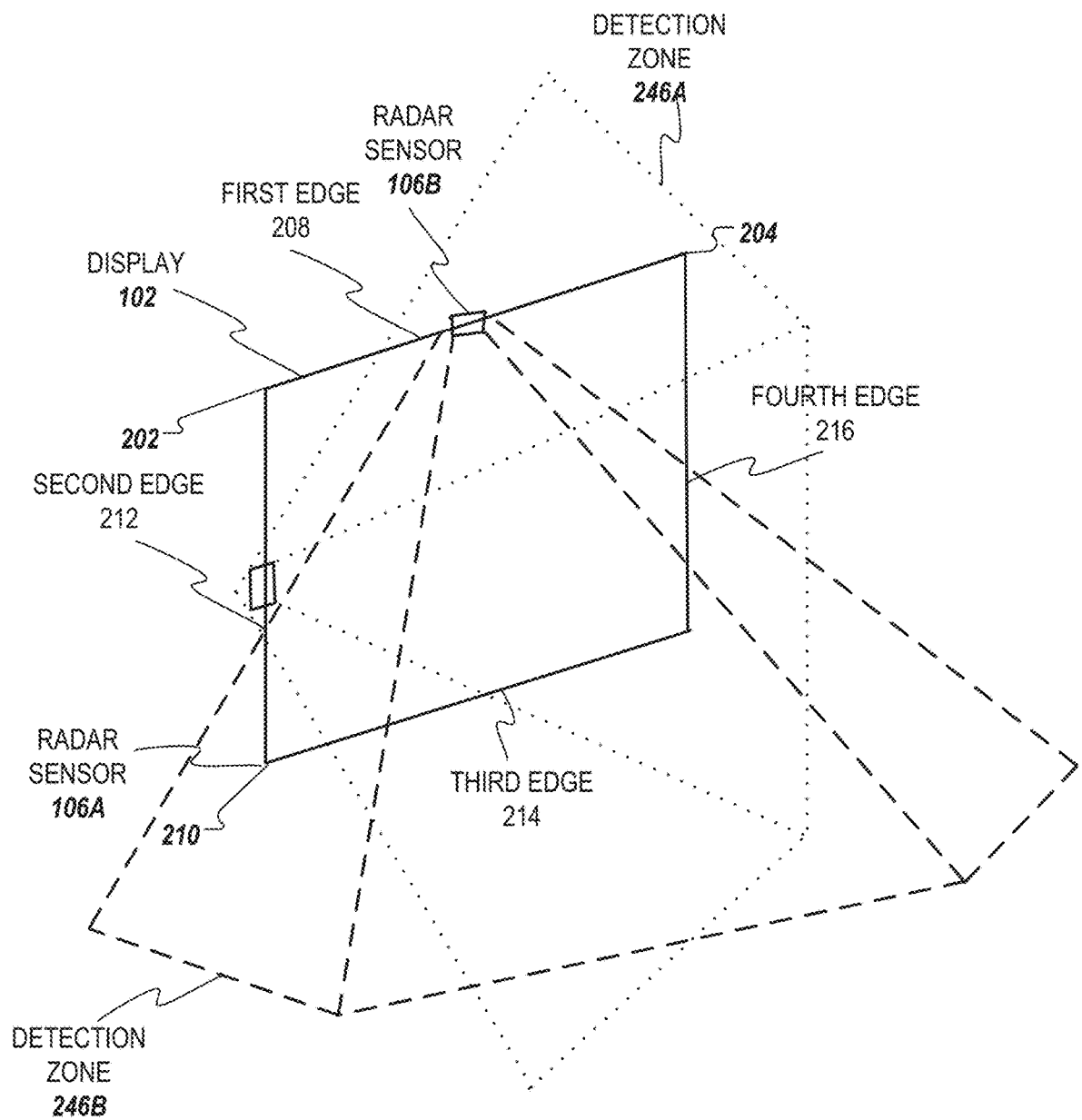
FIG. 2C depicts two overlapping detection zones above a surface of the display of FIG. 1 according to at least one embodiment.

FIG. 2C depicts two overlapping detection zones above a surface of the display of FIG. 1 according to at least one embodiment. The first radar sensor 106A is located at the second edge 212 between the first corner 202 and the third corner 210 and is oriented at an angle above a first plane of the surface such that the surface is in a first FoV of the first radar sensor 106A. The first radar sensor 106A is pointed towards a center of the display 102 so that the first FoV creates a first detection zone 246A. The first radar sensor 106 can detect an object on, or proximate to, the surface of the display 102. The second radar sensor 106B is located at the first edge 208, between the first corner 202 and the second corner 204. It is oriented at the angle above the first plane of the surface such that the surface is in a second FoV of the second radar sensor 106B. The second radar sensor 106B is pointed towards the center of the display 102 so that the second FoV creates a second detection zone 246B. The first edge 208 and the second edge 212 are adjacent edges of the display 102. In other embodiments, the radar sensors can be disposed on opposite edges of the display 102.

In another embodiment, an electronic device includes a display with a surface disposed along a first plane, a first radar sensor, and a processor (or processing device). The first radar sensor is disposed at a first intersection between a first edge of the display and a second edge of the display, wherein the first RADAR sensor is oriented to capture a first field-of-view (FoV) across the surface of the display. The processing device is coupled to the radar sensor and receives first data from the first radar sensor, the first data indicating a first object detection at a first location. The first data can include a first distance corresponding to a detection range from the first radar sensor, a first angle corresponding to a distance from one of the first edge or the second edge, and a second angle corresponding to an elevation distance above the surface. The processing device determines a second location on the surface of the display proximate the first location using at least one of the first distance, the first angle, or the second angle. In some cases, two of the three values are needed if two radar sensors are used. If one sensor is used, all three values are needed. The processing device can determine a second distance from the first location to the second location using at least one of the first distance, the first angle, or the second angle. The processing device determines a touch event corresponding to the second location responsive to determining that the second distance is within a threshold.

In a further embodiment, the electronic device includes a second radar sensor disposed at a second intersection between the first edge of the display and a third edge of the display. The second radar sensor is oriented to capture a second FOV across the surface of the display, and the second FOV intersects the first FOV. The processing device receives second data from the second radar sensor, the first data indicating a second object detection at the first location. In at least one embodiment, the touch event is determined using the first and second data. In a further embodiment, the processing device receives, from the first radar sensor, second data indicating a second object detection corresponding to a third location and determines, using the first data and the second data, a gesture event associated with the display, wherein the gesture event corresponds to at least one of a swipe motion event, a pinch motion event, or a multi-touch event.

In another embodiment, an electronic device includes a display disposed along a first plane, a first radar sensor coupled to the display, and a processor coupled to the first radar sensor. The first radar sensor is oriented to include a first FoV along a first portion of the first plane. In some embodiments, the radar sensor points parallel to the surface. In other embodiments, the radar sensor points towards the surface. The direction between the middle of the detection zone can be parallel to the surface or can form an acute angle down to the surface. From the first radar sensor, the processor receives first data indicating a first object detection corresponding to a first location and determines, using the first data, a touch event associated with the display. In at least one embodiment, an action or an update to the display can be performed responsive to the touch event. The first radar sensor can be disposed at a first corner of the display or a first corner of the electronic device. The first FoV of the first radar sensor can be directed towards a second corner of the display opposite the first corner.

The electronic device includes a second radar sensor coupled to the display and the processor in another embodiment. The second radar sensor is oriented to include a second FoV directed along a second portion of the first plane. The second FoV intersects the first FoV. The intersecting FoV can improve object detection from occlusions. The processor receives, from the second radar sensor, second data indicating a second object detection. The touch event can be determined using the first data and the second data. The use of two radar sensors sharing a common edge can simplify the processing calculations as one less variable is needed because it is assumed that the radar sensors share a common coordinate in one dimension. For example, taking range data from two locations results in two solutions. Putting the radar sensors along a common edge allows an inaccurate solution to be eliminated. In another embodiment, the first and second radar sensors are disposed along a first edge of the display.

In another embodiment, the processor determines, using the first data, a second location on the display proximate the first location, where the touch event corresponds to the second location. In another embodiment, the first data includes a first distance from the first radar sensor to the first location and a first angle between the first plane and a vector defined by the first distance. The second location is determined using the first distance and the first angle. In another embodiment, the first data includes a first distance from the first radar sensor to the first location and a first angle between a first edge of the display, and a projection of a vector defined by the first distance and projected onto the first plane. The second location is determined using the first distance and the first angle.

In another embodiment, the processor determines the first distance between the first and second locations and determines that the first distance is within a threshold. The touch event is determined responsive to determining that the first distance is within the threshold distance. Alternatively, a threshold function can be used to calculate the value based on a location across the surface of the display.

In another embodiment, the processor receives first data and second data from the first radar sensor. The second data indicates a second object detection corresponding to a second location. Using the first and the second data, the processor determines a gesture event associated with the display. The gesture event can correspond to at least one of a swipe motion event, a pinch motion event, or a multi-touch event.

Figure 3A:
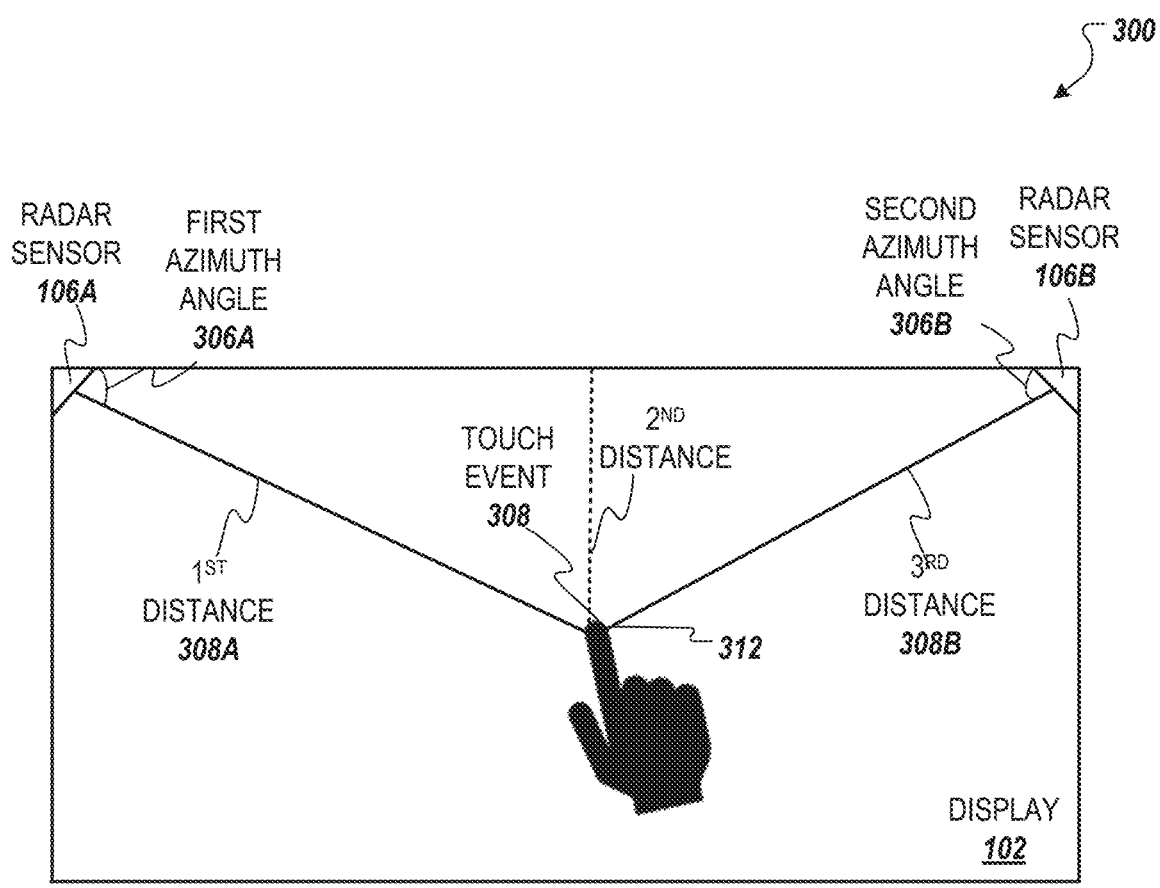
FIGS. 3A-3B illustrate a 2D localization of a touch event using the touch detection system of FIG. 1, according to at least one embodiment.
Figure 3B:
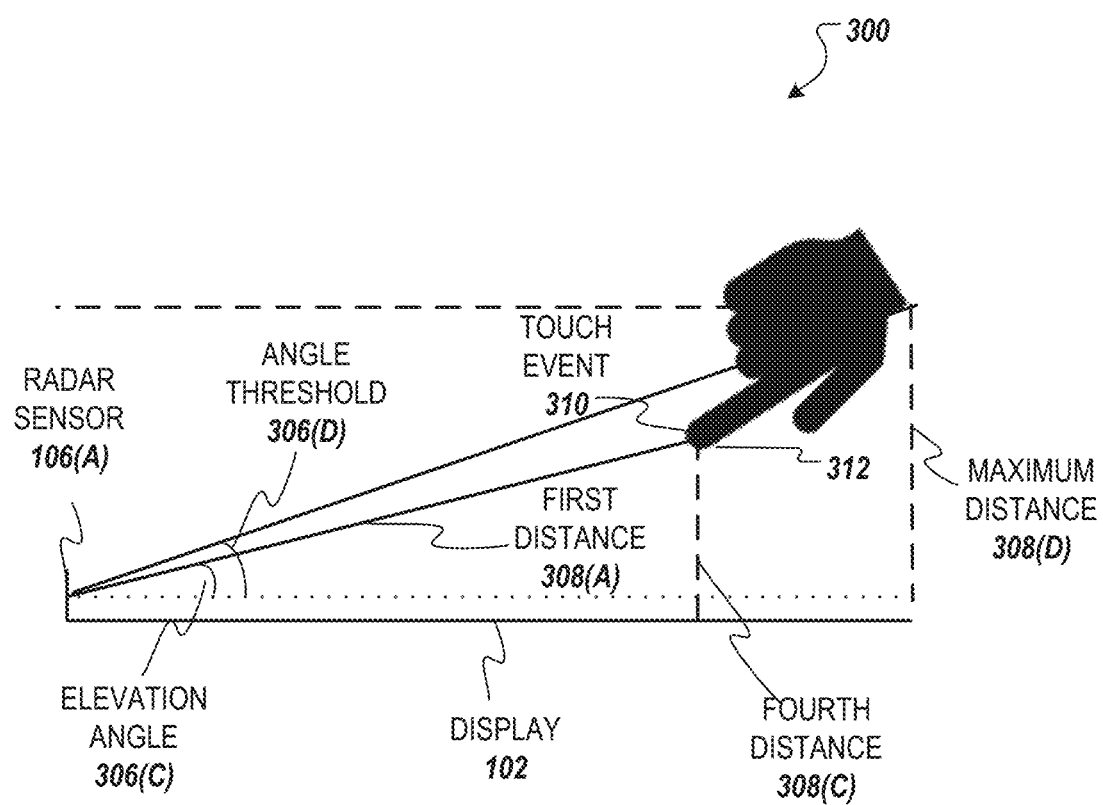

FIGS. 3A-3B illustrate a 2D localization 300 of a touch event 308 using the touch detection system of FIG. 1, according to at least one embodiment. For 2D localization 300, the processing device 110 (not illustrated in FIG. 3) receives the first data from the first radar sensor 106A. The first radar sensor 106A can be a mmWave radar sensor that can measure range, velocity, angles, including an azimuth angle ($\theta$) and an elevation angle ($\varphi$). The first radar sensor 106A can include a transmitter and multiple receivers. The first radar sensor 106A can determine a first distance 308A between the first radar sensor 106A, and an object 312. The first radar sensor 106A can determine a first azimuth angle 306A between a reference axis (e.g., a first edge of the display 102) and the object 312. The second radar sensor 106B can determine a second distance 308B between the second radar sensor 106B and the object 312. The second radar sensor 106B can determine a second azimuth angle 306B between the reference axis (e.g., a first edge of the display 102) and the object 312. The processing device can use one or more of the first distance 308A, the second distance 308B, the first angle 306A, and the second angle 306B to determine the 2D coordinates of the object 312 on the display 102. It should be noted that the processing device can determine an absolute or relative position of the object 312. The position can be at a location above the 2D surface. In some cases, the objects detected above an angle threshold corresponding to a maximum height about the surface should not be detected as touch events. In some cases, a position above the surface can be projected onto the 2D coordinate system in the x-y plane corresponding to the surface of the device.

In other embodiments, the first radar sensor 106A can determine a first velocity of the object 312. The second radar sensor 106B can determine a second velocity of the object 312. The velocity information from both radar sensors can be used to resolve multiple objects touching or in proximity to the surface of the display 102. The processing device can use the Doppler resolution of the radar sensors and radar algorithms to resolve two fingers on the display 102, such as used for pinch and zoom gestures. The first velocity can be in a range axis of the first radar sensor 106A, and the second velocity can be in a range axis of the second radar sensor 106B. The processing device can use at least one of the first velocity or the second velocity to determine a position of the object 312, a direction of the object 312, a path of the object 312, a type of touch event or gesture, or to resolve multiple touch events.

In other embodiments, the first radar sensor 106A can determine an elevation angle (φ) 306(C) between the first plane and the object 312, as illustrated in FIG. 3B. In particular, the first radar sensor 106A can determine the touch event 310 responsive to a determination that the elevation angle (φ) 306(C) is less than an angle threshold 306(D). The elevation angle 306(c) corresponds to a fourth distance 308(C). The angle threshold 306(D) represents a maximum distance 308(D) above the surface of the display 102 where an object is detected as a touch event. The angle threshold 306(D) can vary based on the dimensions of the display 102. The angle threshold 306(D) can be a programmable parameter in the processing device. If the elevation angle between the plane of the surface and an object is greater than the angle threshold 306(D), the processing device can determine no touch event for the object. The processing device can use the elevation information to reject any detections above the angle threshold 306(D). For example, fingers hovering above a certain height above the display 102 less than the maximum distance 308(D) (or maximum height) can be treated the same as touch events. Alternatively, the processing device can determine a hover event for an object responsive to a determination that the elevation angle (φ) 306(C) is greater than a first angle threshold that represents a maximum distance above the surface where an object is detected as a touch event and less than a second angle threshold that represents a maximum distance above the surface where the object is detected as a hover event. In at least one embodiment, the angle threshold 306(D) (also referred to as an elevation threshold) is approximately 8 degrees. In the case of a 15.6" display, the maximum distance 308(D) is about 45 mm at the bottom center of the display. The maximum distance 308(D) can be considered a detection threshold.

Figure 4:
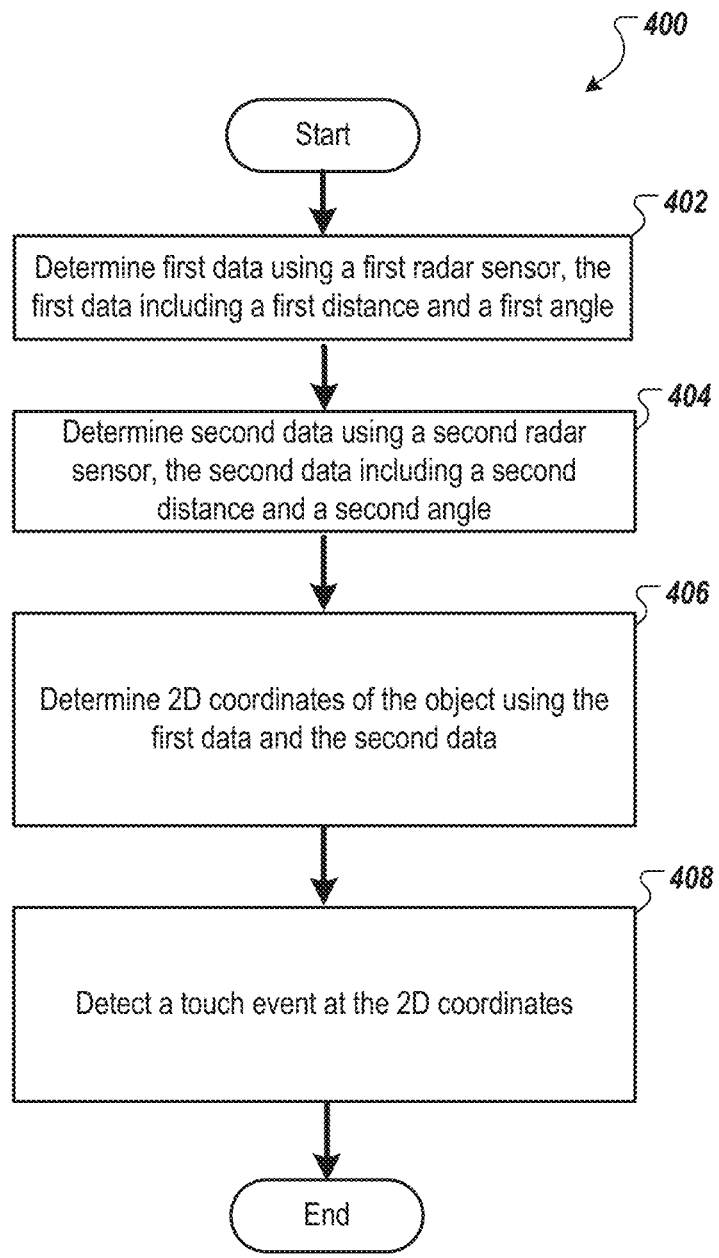
FIG. 4 is a flow diagram of a method for detecting a touch event using multiple radar sensors according to at least one embodiment.

FIG. 4 is a flow diagram of a method 400 for detecting a touch event using multiple radar sensors according to at least one embodiment. The method 400 may be performed by processing logic that may comprise hardware (e.g., circuitry, dedicated logic, programmable logic, microcode, etc.), software (such as instructions running on the processor), firmware, or a combination thereof. In one embodiment, the user device 104 of FIG. 1 performs the method 400. In another embodiment, the processing device 110 of FIG. 1 performs the method 400. Alternatively, other components of a disclosed device may perform some or all of the operations of the method 400.

With further reference to FIG. 4, the method 400 may begin with the processing logic determining, using a first radar sensor, first data identifying i) a first distance between the first radar sensor and the object, and ii) a first angle in a first plane of a surface between a first edge of the surface and the object, the first angle corresponding to a second distance from one of the first edge or a second edge of the surface (block 402). The processing logic determines, using a second radar sensor, second data identifying i) a third distance between the second radar sensor and the object, and ii) a second angle in the first plane between the first edge and the object, the second angle corresponding to a fourth distance from one of the first edge or a third edge of the surface (block 404). The processing logic determines the 2D coordinates of the object on the surface using the first and second data (block 406). The processing logic detects a touch event at the two-dimensional coordinates (block 408), and the method 400 ends.

In a further embodiment, the first data includes iv) first velocity information of the object, and the second data includes iv) second velocity information of the object. The processing logic receives third data from the first radar sensor, the third data identifying i) a fifth distance between the first radar sensor and a second object, ii) a third angle in the first plane between a first edge of the surface and the second object, the third angle corresponding to a sixth distance from one of the first edge or a second edge of the surface, and iii) third velocity information of the second object. The processing logic receives fourth data from the second radar sensor, the fourth data identifying i) a seventh distance between the second radar sensor and the second object; ii) a fourth angle in the first plane between the first edge and the second object, the fourth angle corresponding to an eighth distance from one of the first edge or a third edge of the surface, and iii) fourth velocity information of the second object. In at least one embodiment, the processing logic determines the second 2D coordinates of the second object on the display using the third and fourth data. In at least one embodiment, the processing logic determines a gesture event associated with the display using the first, second, third, and fourth data. The gesture event corresponds to at least one of a swipe motion event, a pinch motion event, or a multi-touch event.

In another embodiment, the processing logic receives third data from the at least one radar sensor, the third data identifying i) a fifth distance between the at least one radar sensor and a second object, and ii) a third angle from the first plane to the second object corresponding to an elevation distance of the object above the first plane. The processing logic determines that there is no touch event for the second object responsive to a determination that the third angle is less than an angle threshold that represents a maximum distance above the surface where an object is detected as a touch event.

In another embodiment, the processing logic receives third data from the at least one radar sensor, the third data identifying i) a fifth distance between the at least one radar sensor and a second object, and ii) a third angle from the first plane to the second object corresponding to an elevation distance of the object above the first plane. The processing logic determines a hover event for the second object responsive to a determination that the third angle is greater than a first angle threshold that represents a maximum distance above the surface where an object is detected as a touch event and less than a second angle threshold that represents a maximum distance above the surface where the object is detected as a hover event.

Figure 5:
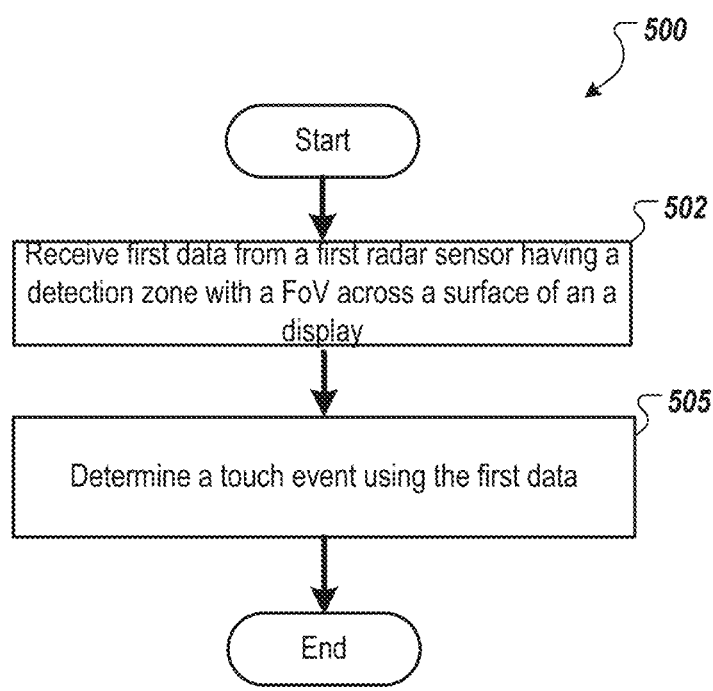
FIG. 5 is a flow diagram of a touch detection method using radar technology according to at least one embodiment.

FIG. 5 is a flow diagram of a touch detection method 500 using radar technology according to at least one embodiment. The touch detection method 500 may be performed by processing logic that may comprise hardware (e.g., circuitry, dedicated logic, programmable logic, microcode, etc.), software (such as instructions running on the processor), firmware, or a combination thereof. In one embodiment, the user device 104 of FIG. 1 performs the touch detection method 500. In another embodiment, the processing device 110 of FIG. 1 performs the touch detection method 500. Alternatively, other components of a disclosed device may perform some or all of the operations of the touch detection method 500.

With further reference to FIG. 5, the method 500 may begin with the processing logic receiving first data from a first radar sensor comprising a detection zone having a field-of-view (FoV) across a surface of a display (block 502). The first data indicates a first object detection corresponding to a first location. The processing logic determines, using the first data, a touch event associated with the display (block 504), and the method 500 ends.

In another embodiment, the processing logic determines, using the first data, a second location on the surface of the display proximate the first location. The touch event corresponds to the second location. In another embodiment, the first data includes a first distance from the first radar sensor to the first location, a first angle between the surface of the display, and a vector defined by the first distance. The second location can be determined using the first distance. The second location can be determined using the first distance and the first angle. In at least one embodiment, the first distance is a first range between the first radar sensor and the object (i.e., an object detection location), and the first angle is an elevation angle. In some embodiments, the processing logic uses a distance, an azimuth angle, and an elevation angle to determine a touch event and/or a location of the touch event on the surface. The use of multiple sensors allows the touch event to be detected with only two of the distance, azimuth angle, and elevation angle. In some cases, the azimuth angle is the least reliable. This lack of reliability is one rationale for using a second radar sensor to depend on a second range (distance measurement) over the azimuth measurement of the first sensor.

In another embodiment, the first data includes a first distance from the first radar sensor to the first location, a first angle between the surface of the display, and a vector defined by first distance. The second location is determined using the first distance, and the second location can be determined using the first distance and the first angle.

In another embodiment, the first data includes a first distance from the first radar sensor to the first location, a first angle between a first edge of the display, and a projection of a vector defined by the first distance and projected onto the surface of the display. The second location can be determined using the first distance and the first angle.

In another embodiment, the processing logic determines, using the first data, a first distance between the first location and the second location. The processing logic determines that the first distance is within a threshold distance. The touch event can be determined responsive to determining that the first distance is within the threshold distance.

In another embodiment, the processing logic receives second data from the first radar sensor, indicating a second object detection corresponding to a second location. The processing logic determines, using the first data and the second data, a gesture event associated with the display. In at least one embodiment, the gesture event corresponds to at least one of a swipe motion event, a pinch motion event, or a multi-touch event.

Figure 6:
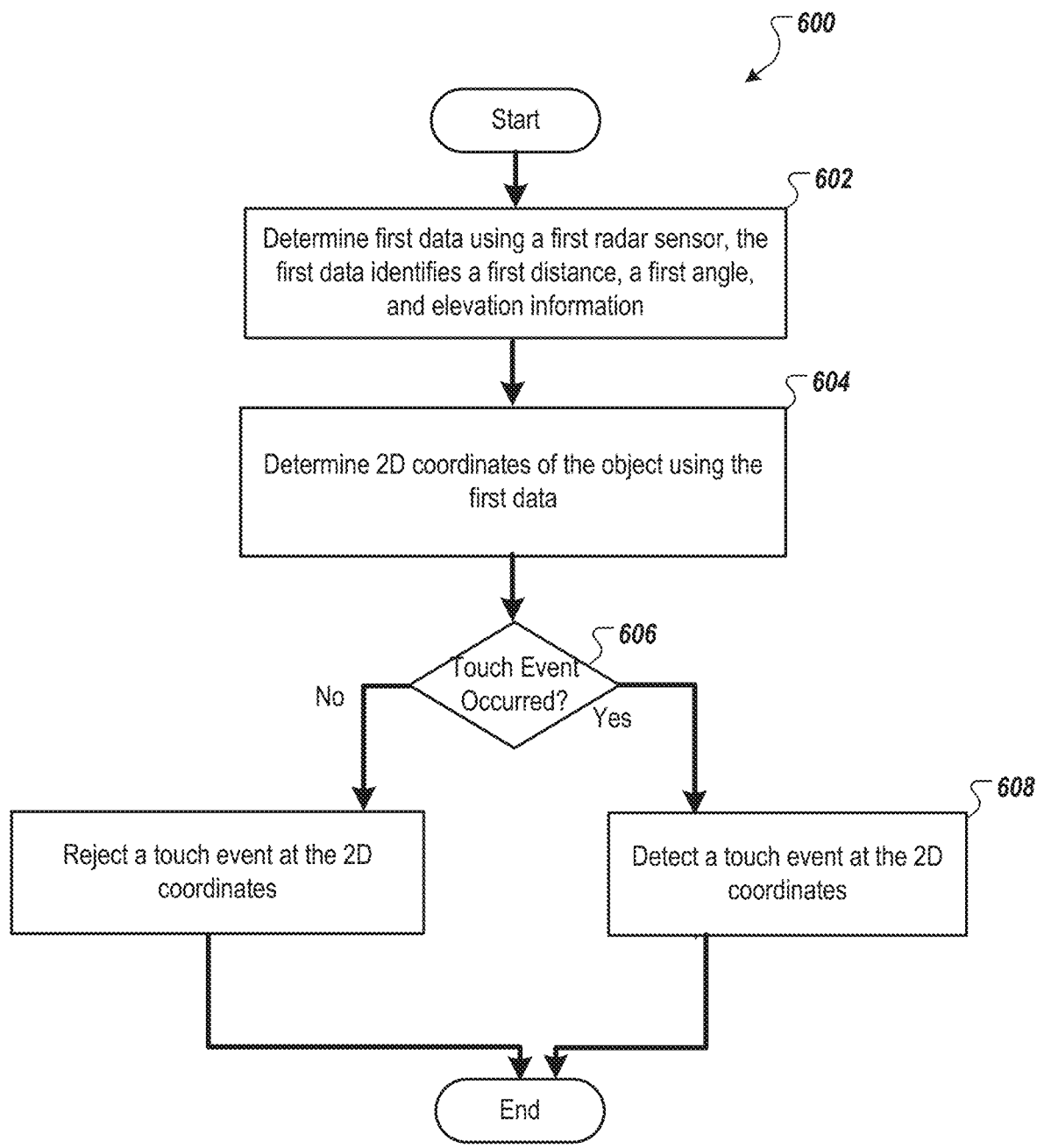
FIG. 6 is a flow diagram of a method for detecting a touch event using elevation information from a radar sensor according to at least one embodiment.

FIG. 6 is a flow diagram of a method 600 for detecting a touch event using elevation information from a radar sensor according to at least one embodiment. The method 600 may be performed by processing logic that may comprise hardware (e.g., circuitry, dedicated logic, programmable logic, microcode, etc.), software (such as instructions running on the processor), firmware, or a combination thereof. In one embodiment, the user device 104 of FIG. 1 performs the method 600. In another embodiment, the processing device 110 of FIG. 1 performs the method 600. Alternatively, other components of a disclosed device may perform some or all of the operations of the method 600.

With further reference to FIG. 6, the method 600 may begin with the processing logic determining first data using a first radar sensor (block 602). The first data identifies a first distance, a first angle, and elevation information. The processing logic determines the 2D coordinates of the object using the first data (block 604). The processing logic determines whether a touch event occurred (block 606). In at least one embodiment, the processing logic determines whether the touch event occurred using the elevation information (block 606). In at least one embodiment, the processing logic determines an elevation angle between the first plane of the surface and the object and compares the elevation angle with a threshold value to determine whether the touch event occurred at block 606. The threshold value corresponds to a maximum height or distance above the surface within with the object is detected as a touch event. If the touch event occurred at block 606, the processing logic detects and outputs a touch event at the 2D coordinates (block 608), and the method 600 ends. If the touch event did not occur at block 606, the processing logic rejects a touch event at the 2D coordinates (block 610), and the method 600 ends.

Figure 7:
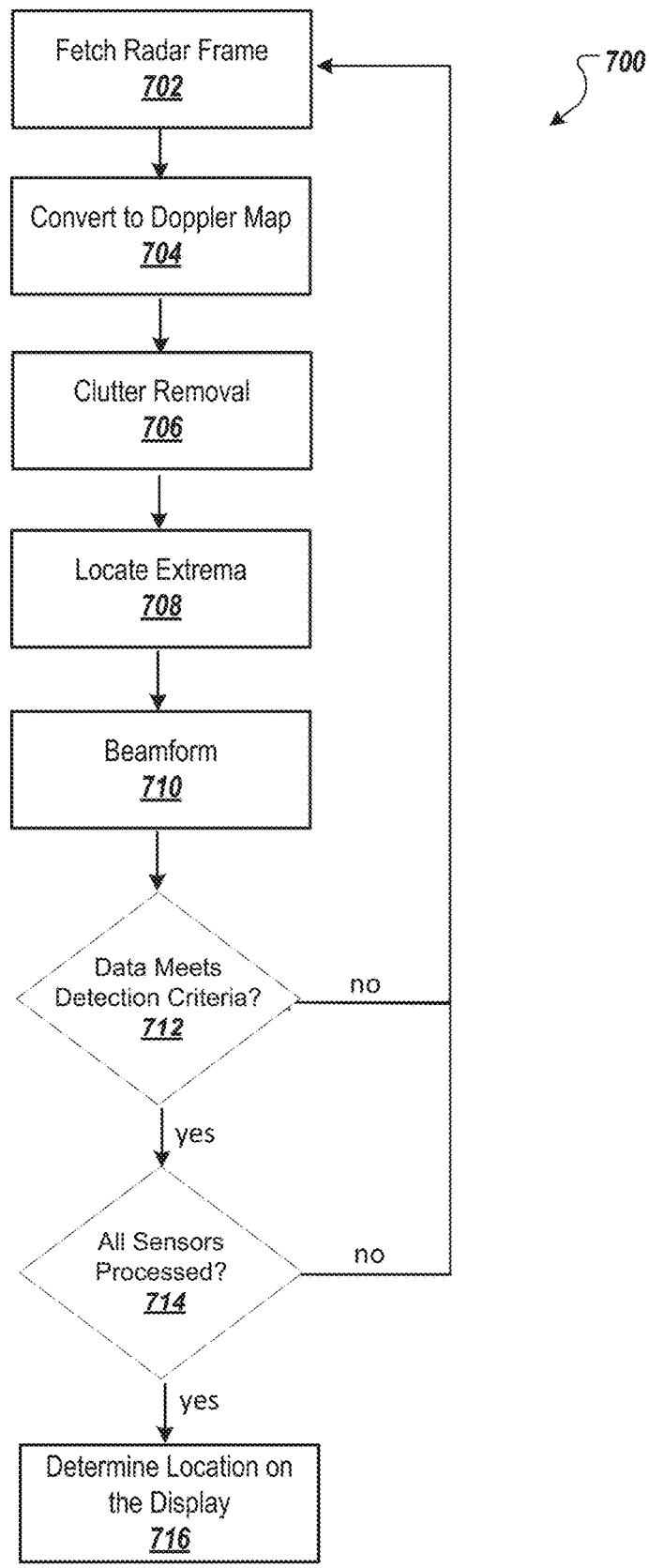
FIG. 7 is a flow diagram of a method for processing radar data to determine event locations according to at least one embodiment.

FIG. 7 is a flow diagram of a method 700 for processing radar data to determine event locations according to at least one embodiment. The method 700 may be performed by processing logic that may comprise hardware (e.g., circuitry, dedicated logic, programmable logic, microcode, etc.), software (such as instructions running on the processor), firmware, or a combination thereof. In one embodiment, the user device 104 of FIG. 1 performs the method 700. In another embodiment, the processing device 110 of FIG. 1 performs the method 700. Alternatively, other components of a disclosed device may perform some or all of the operations of the method 700.

With further reference to FIG. 7, the method 700 may begin with the processing logic fetching a radar frame (block 702). The processing logic converts the raw sample of the radar frame to a range-doppler map (block 704). The processing logic performs clutter removal by moving target indication (i.e., removing reflections from static objects) (block 706). The processing logic can locate a range-doppler bin with the highest energy (also called "extrema") (block 708). The processing logic can perform beamforming to obtain an elevation angle of the bin identified at block 708. The processing logic can check against detection criteria at block 712. The detection criteria can be a checked to determine whether energy is above a detection threshold, whether an elevation angle is below a threshold, whether the ranges detected by two or more receivers of the radar sensors are aligned, or the like. If the criteria are not met at block 712, the processing logic returns to block 702 to fetch the next radar frame. If the criteria are met at block 712, the processing logic determines ether all radar sensors are processed (block 714). If not, the processing logic returns to block 702 to fetch the next radar frame from the next radar sensor. If the processing logic determines that all radar sensors have been processed at block 714, the processing logic determines a location on a display (block 716), and the method 700 ends. The processing logic can convert the range information, returned at block 712 if all criteria are met, to x-y coordinates.

Figure 8A:
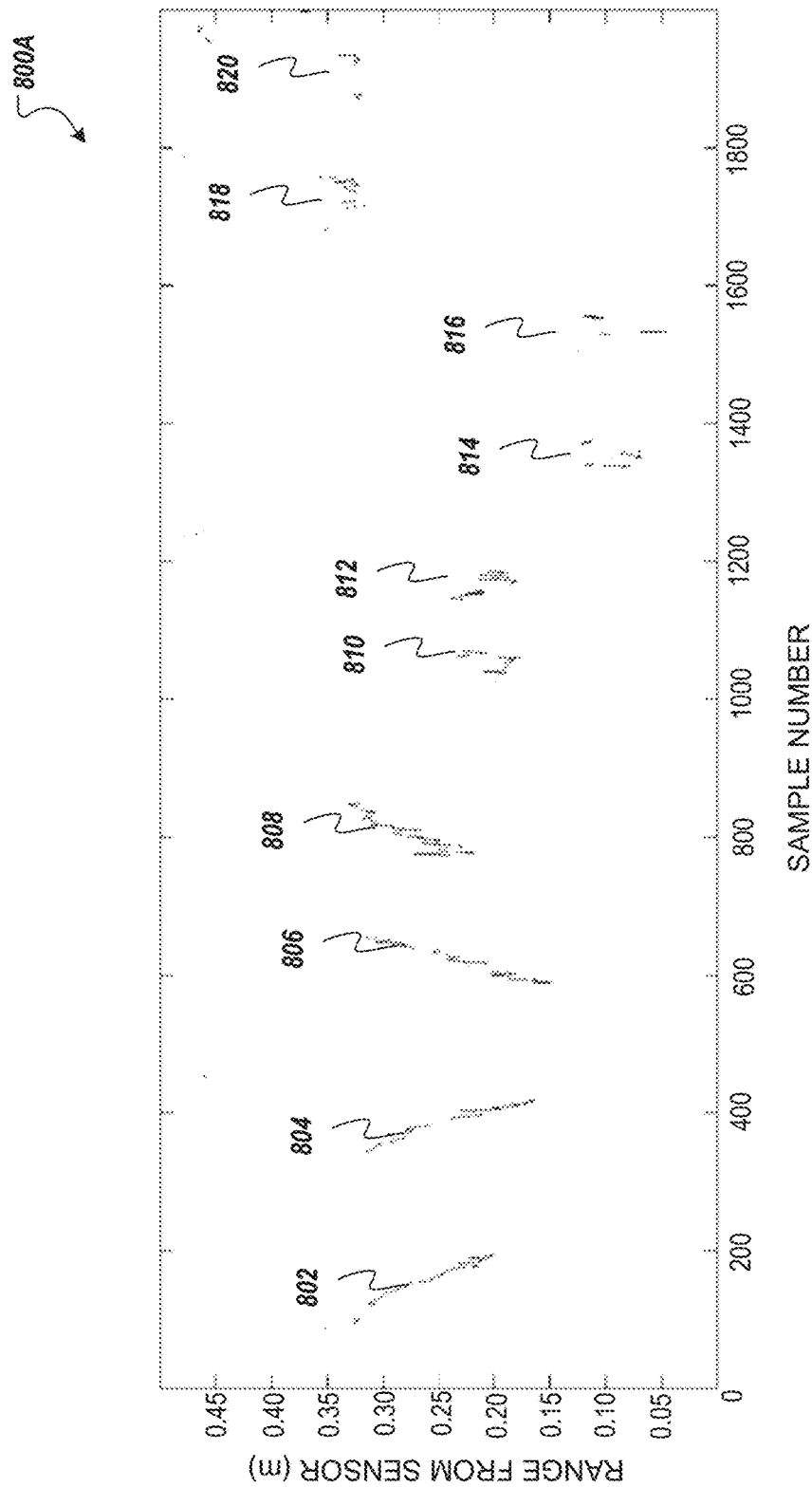
FIG. 8A is a graph illustrating radar data indicating single-finger touch events according to various embodiments.

FIG. 8A is a graph 800A illustrating radar data indicating single-finger touch events according to various embodiments. Graph 800A illustrates various single-finger touch events, including a first swipe 802 towards a radar sensor, a second swipe 804 toward a radar sensor, a third swipe 806 away from a radar sensor, a fourth swipe 808 away from a radar sensor, a first tap 810 at a center of the screen, a second tap 812 at a center of the screen, a third tap 814 near a radar sensor, a fourth tap 816 near a radar sensor, a fifth tap 818 at a far end of the screen, and a sixth tap 820 at a far end of the screen.

In some embodiments, a simple peak energy detection (e.g., centroid calculation) can be performed to localize a single object, such as a finger. The peak energy detection may not be scalable for multi-finger detection. As described herein, the doppler resolution of the radar and radar algorithms can be leveraged to resolve multiple objects, such as multiple fingers being used in a multi-finger gesture like a pinch or zoom-in gesture illustrated in FIG. 8B.

Figure 8B:
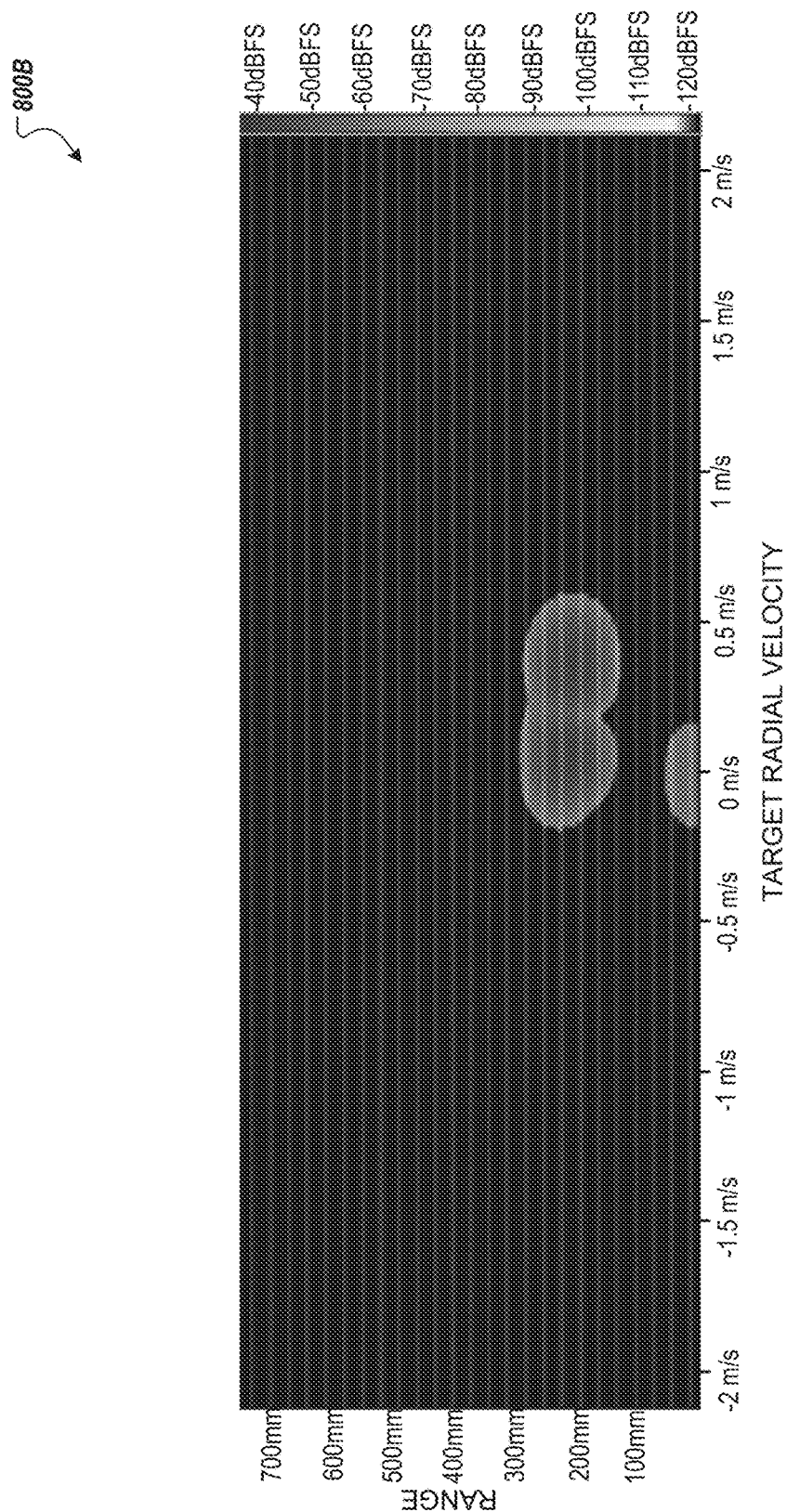
FIG. 8B is a graph illustrating radar data indicating a two-finger gesture on a radar range-Doppler map according to at least one embodiment.

FIG. 8B is a graph 800B illustrating radar data indicating two-finger gesture on radar range-Doppler map according to at least one embodiment. The graph 800B is a radar range-Doppler map with two peaks corresponding to two fingers in a zoom-in gesture.

Figure 9:
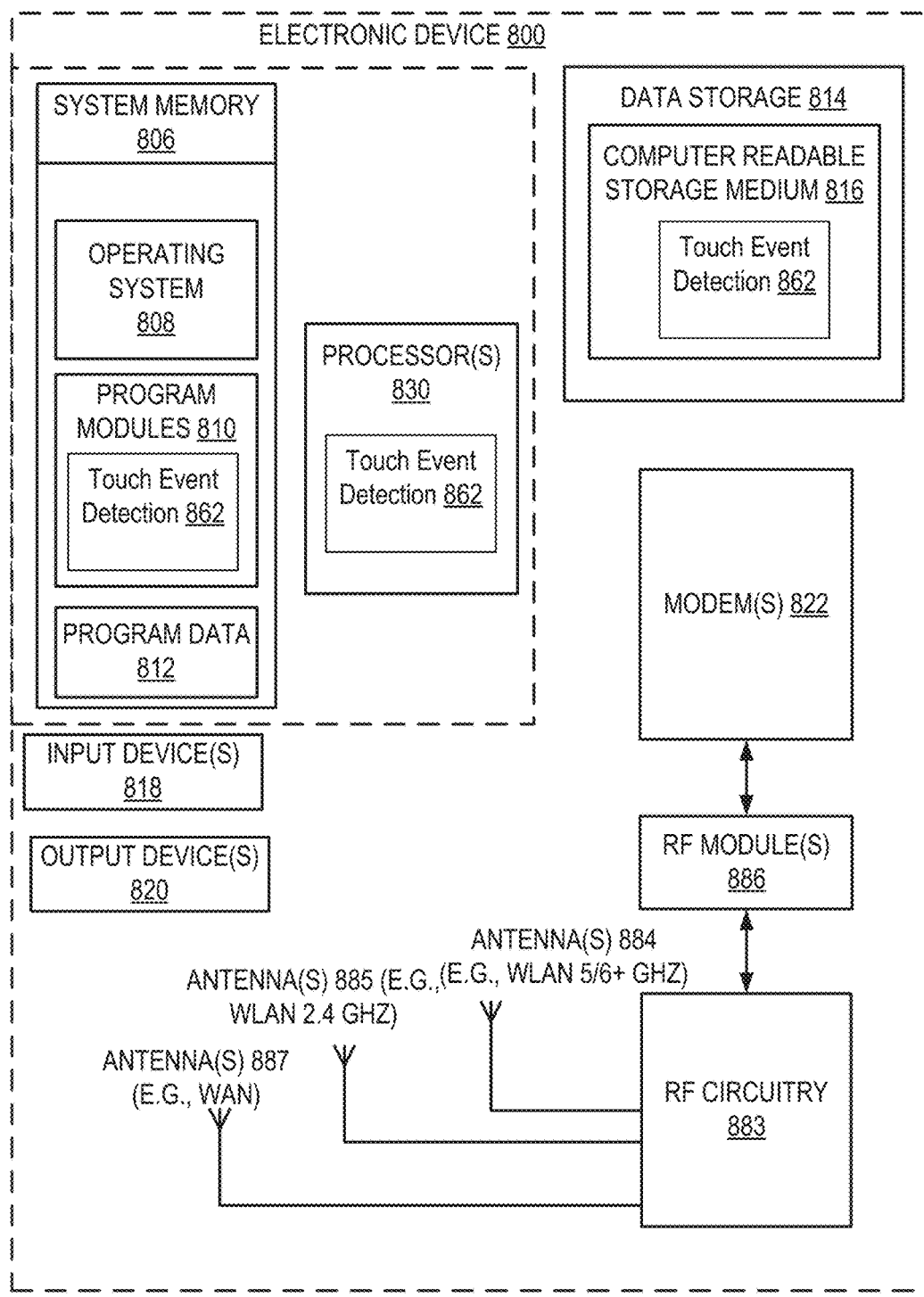
FIG. 9 is a block diagram of an electronic device with touch detection logic, according to one embodiment.

FIG. 9 is a block diagram of an electronic device 900 with touch event detection logic 862, according to one embodiment. The electronic device 900 may correspond to the user devices described herein. The electronic device 900 includes one or more processor(s) 930, such as one or more CPUs, microcontrollers, field-programmable gate arrays, or other types of processors. The electronic device 900 also includes system memory 906, which may correspond to any combination of volatile and/or non-volatile storage mechanisms. The system memory 906 stores information that provides operating system component 908, various program modules 910, program data 912, and/or other components. The program modules 910 may include instructions of the touch event detection logic 862. The touch event detection logic 862 can perform any of the operations described herein. In one embodiment, the system memory 906 stores instructions of methods to control the operation of the electronic device 900. The electronic device 900 performs functions by using the processor(s) 930 to execute instructions provided by the system memory 906.

The electronic device 900 also includes a data storage device 914 that may be composed of one or more types of removable storage and/or one or more types of non-removable storage. The data storage device 914 includes a computer-readable storage medium 916 on which is stored one or more sets of instructions embodying any of the methodologies or functions described herein. Instructions for the program modules 910 may reside, completely or at least partially, within the computer-readable storage medium 916, system memory 906 and/or within the processor(s) 930 during execution thereof by the electronic device 900, the system memory 906, and the processor(s) 930 also constituting computer-readable media. The electronic device 900 may also include one or more input devices 918 (keyboard, mouse device, specialized selection keys, etc.) and one or more output devices 920 (displays, printers, audio output mechanisms, etc.).

The electronic device 900 further includes a modem 922 to allow the electronic device 900 to communicate via wireless connections (e.g., provided by the wireless communication system) with other computing devices, such as remote computers, an item providing system, and so forth. The modem 922 can be connected to one or more RF modules 986. The RF modules 986 may be a WLAN module, a WAN module, a personal area network (PAN) module, a GPS module, or the like. The antenna structures (antenna(s) 984, 985, and 987) are coupled to the RF circuitry 983, which is coupled to the modem 922. The RF circuitry 983 may include radio front-end circuitry, antenna switching circuitry, impedance matching circuitry, or the like. In one embodiment, the RF circuitry 983 includes the RFFE circuitry with high selectivity performance as described in the various embodiments of FIGS. 1-6. The antennas 984 may be GPS antennas, NFC antennas, other WAN antennas, WLAN or PAN antennas, or the like. The modem 922 allows the electronic device 900 to handle both voice and non-voice communications (such as communications for text messages, multimedia messages, media downloads, web browsing, etc.) with a wireless communication system. The modem 922 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 922 may generate signals and send these signals to antenna(s) 984 of a first type (e.g., WLAN 5/6+ GHz), antenna(s) 985 of a second type (e.g., WLAN 2.4 GHz), and/or antenna(s) 987 of a third type (e.g., WAN), via RF circuitry 983, and RF module(s) 986 as described herein. Antennas 984, 985, and 987 may be configured to transmit in different frequency bands and/or using different wireless communication protocols. The antennas 984, 985, and 987 may be directional, omnidirectional, or non-directional antennas. In addition to sending data, antennas 984, 985, and 987 may also receive data, which is sent to appropriate RF modules connected to the antennas. One of the antennas 984, 985, 987 may be any combination of the antenna structures described herein.

In one embodiment, the electronic device 900 establishes a first connection using a first wireless communication protocol and a second connection using a different wireless communication protocol. The first wireless connection and second wireless connection may be active concurrently, for example, if an electronic device is receiving a media item from another electronic device (e.g., a mini-POP node) via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band. The second wireless connection is associated with a second resonant mode of the antenna structure that operates at a second frequency band. In another embodiment, the first wireless connection is associated with a first antenna structure, and the second wireless connection is associated with a second antenna.

Though a modem 922 is shown to control transmission and reception via antenna (984, 985, 987), the electronic device 900 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An electronic device, comprising:
a display comprising a first edge, a second edge, and a third edge;
a first radar unit disposed at a first corner between the first edge and the second edge, wherein the first radar unit is oriented to direct a first field-of-view (FoV) across a surface of the display;
a second radar unit disposed at a second corner between the first edge and the third edge, wherein the second radar unit is orientated to direct a second FoV across the surface of the display, wherein the first FoV and the second FoV overlap; and
a processing device coupled to the first radar unit and the second radar unit, wherein the processing device:
receives first data from the first radar unit, the first data identifying i) a first distance between the first radar unit and an object, and ii) a first angle between the first edge and a first axis extending from the object to the first corner, the first angle corresponding to a second distance from one of the first edge or the second edge to the object;
receives second data from the second radar unit, the second data identifying i) a third distance between the second radar unit and the object, and ii) a second angle between the first edge and a second axis extending from the object to the second corner, the second angle corresponding to a fourth distance from one of the first edge or the third edge to the object, iii) a third angle between the surface and a third axis extending from the object to the first corner, the third angle corresponding to a fourth distance of the object above the surface;
determines two-dimensional coordinates of a location of the object using the first data and the second data;

detects a touch event responsive to a determination that the third angle is less than a first angle threshold; and outputs data representing a touch input at the location.

2. The electronic device of claim 1, wherein:

the second data further identifies iii) a fourth angle between the surface and a fourth axis extending from the object to the second corner, the fourth angle corresponding to the fourth distance of the object above the surface; and the processing device further detects the touch event responsive to a determination that the third angle and the fourth angle are less than the first angle threshold.

3. The electronic device of claim 1, wherein:

the first data comprises iv) first velocity information of the object;

the second data comprises iv) second velocity information of the object;

wherein the processing device further:

determines, using the first radar unit, third velocity information of a second object;

determines, using the second radar unit, fourth velocity information of the second object; and determines a gesture event associated with the display using the first velocity information, the second velocity information, the third velocity information, and the fourth velocity information, wherein the gesture event corresponds to at least one of a swipe motion event, a pinch motion event, or a multi-touch event.

4. An electronic device comprising:

a surface;

a processing device; and a sensing system coupled to the processing device, the sensing system comprising at least one transmitter to transmit sound or electromagnetic waves and at least one receiver to measure reflected waves to determine one or more distance values between the sensing system and an object and one or more angle values between the sensing system and the object, wherein the sensing system is oriented to direct a field-of-view (FoV) of the sensing system at the surface, wherein the processing device is to detect a touch event on, or proximate to, the surface by the object using the one or more distance values and the one or more angle values, wherein the processing device is to:

receive, from the at least one receiver, first data identifying a first angle between a plane upon which the surface is disposed and a first axis extending from the object to the at least one receiver, the first angle corresponding to a first elevation distance of the object above the surface; and detect the touch event responsive to a determination that the first angle is less than a first angle threshold.

5. The electronic device of claim 4, wherein the sensing system comprises:

a first radar unit located at a first corner of the electronic device, wherein the first radar unit is pointed diagonally towards a center of the electronic device; and a second radar unit located at a second corner of the electronic device, wherein the second radar unit is pointed diagonally towards the center of the electronic device, wherein the surface is in a first FoV of the first radar unit and a second FoV of the second radar unit.

6. The electronic device of claim 4, further comprising:

a display located on the surface, wherein the sensing system comprises:

a first radar unit located at a first corner of the display, wherein the first radar unit is pointed diagonally towards a center of the display; and a second radar unit located at a second corner of the display, wherein the second radar unit is pointed diagonally towards the center of the display, wherein the display is in a first FoV of the first radar unit and a second FoV of the second radar unit.

7. The electronic device of claim 4, further comprising:

a display located on the surface, wherein the sensing system comprises:

a first radar unit located at a first edge of the display, wherein the first radar unit is pointed towards a center of the display; and a second radar unit located at a second edge of the display, wherein the second radar unit is pointed towards the center of the display, wherein the display is in a first FoV of the first radar unit and a second FoV of the second radar unit.

8. The electronic device of claim 7, wherein the first edge and the second edge are adjacent edges of the display.

9. The electronic device of claim 4, wherein the sensing system is a millimeter-wave (mmWave) radar sensor, wherein the mmWave radar sensor is to determine a first distance between the mmWave radar sensor and the object, a velocity of the object, an azimuth angle between a second axis extending from the object to the mmWave radar sensor, and an elevation angle between a second axis extending from the object to the mmWave radar sensor.

10. The electronic device of claim 4, wherein the sensing system comprises a first transmitter and a plurality of receivers, wherein the sensing system is to determine a first distance, a velocity of the object, an azimuth angle between a second axis extending from the object to the sensing system, and an elevation angle between the second axis extending from the object to the sensing system.

11. The electronic device of claim 4, wherein the sensing system comprises a first radar unit located at a first position proximate a display located on the surface and a second radar unit located at a second position proximate the display located on the surface, wherein the processing device, to detect the touch event on, or proximate to, the surface by the object, is further to:

receive the first data from the first radar unit, the first data further identifying i) a first distance between the first radar unit and the object, and ii) a second angle between a first edge of the electronic device and a second axis extending from the object to the first radar unit, the second angle corresponding to a second distance from one of the first edge or a second edge of the electronic device;

receive second data from the second radar unit, the second data identifying i) a third distance between the second radar unit and the object, and ii) a third angle between the first edge and a third axis extending from the object to the second radar unit, the third angle corresponding to a fourth distance from one of the first edge or a third edge of the electronic device;

determine two-dimensional coordinates of the object on the surface using the first data and the second data; and output the touch event at the two-dimensional coordinates.

12. The electronic device of claim 11, wherein:

the second data further identifies iii) a fourth angle between the surface and a fourth axis extending from the object to the second radar unit, the fourth angle corresponding to a second elevation distance of the object above the surface; and the processing device is to detect the touch event responsive to a determination that the first angle and the fourth angle are less than the first angle threshold.

13. The electronic device of claim 11, wherein:
the first data comprises iv) first velocity information of the object;
the second data comprises iv) second velocity information of the object;
wherein the processing device is further to:
determine, using the first radar unit, third velocity information of a second object;
determine, using the second radar unit, fourth velocity information of the second object; and
determine a gesture event associated with the display using the first velocity information, the second velocity information, the third velocity information, and the fourth velocity information, wherein the gesture event corresponds to at least one of a swipe motion event, a pinch motion event, or a multi-touch event.

14. The electronic device of claim 4, wherein the processing device is further to:
identify, via the first data, i) a first distance between the at least one receiver and a second object, and ii) a second angle between the surface and a second axis extending from the second object to the sensing system, the second angle corresponding to an elevation distance of the second object above the surface; and
determine no touch event for the second object responsive to a determination that the second angle is greater than the first angle threshold.

15. The electronic device of claim 4, wherein the processing device is further to:
identify, via the first data, i) a first distance between the at least one receiver and a second object, and ii) a second angle between the surface and a second axis extending from the second object to the sensing system, the second angle corresponding to an elevation distance of the second object above the surface; and
determine a hover event for the second object responsive to a determination that the second angle is greater than the first angle threshold and less than a second angle threshold.

16. A method of an electronic device, the method comprising:
determining, by a first radar unit disposed on a surface, first data identifying i) a first distance between the first radar unit and an object, and ii) a first angle between the surface and a first axis extending from the object to the first radar unit, the first angle corresponding to a second distance from one of a first edge or a second edge of the electronic device;
determining, by a second radar unit disposed on the surface, second data identifying i) a third distance between the second radar unit and the object, and ii) a second angle between the surface and a second axis extending from the object to the second radar unit, the second angle corresponding to a fourth distance from one of the first edge or a third edge of the electronic device;
determining two-dimensional coordinates of a location of the object on the surface using the first data and the second data;
receiving third data from the first radar unit, the third data identifying i) a fifth distance between the first radar unit and a second object, and ii) a third angle between the surface and a third axis extending from the second object to the first radar unit, the third angle corresponding to an elevation distance of the object above the surface; and
determining a touch input at the location responsive to a determination that the third angle is less than a first angle threshold.

17. The method of claim 16, wherein the first data comprises iv) first velocity information, wherein the second data comprises iv) second velocity information, wherein the method further comprises:
receiving fourth data from the first radar unit, the fourth data identifying i) a sixth distance between the first radar unit and a third object, ii) a fourth angle between the first edge of the electronic device and a fourth axis extending from the third object to the first radar unit, the fourth angle corresponding to a seventh distance from one of the first edge or the second edge of the electronic device, and iii) third velocity information;
receiving fifth data from the second radar unit, the fifth data identifying i) an eighth distance between the second radar unit and the third object; ii) a fifth angle between the first edge and a fifth axis extending from the third object to the second radar unit, the fifth angle corresponding to a ninth distance from one of the first edge or a third edge of the electronic device, and iii) fourth velocity information; and
determining second two-dimensional coordinates of a location of the third object on the surface using the third data and the fourth data.

18. The method of claim 17, further comprising:
determining a gesture event associated with a display located on the surface using the first data, the second data, the fourth data, and the fifth data, wherein the gesture event corresponds to at least one of a swipe motion event, a pinch motion event, or a multi-touch event.

19. The method of claim 16, further comprising:
determining no touch event for the second object responsive to a determination that the third angle is less than the first angle threshold.

20. The method of claim 16, further comprising:
determining a hover event for the second object responsive to a determination that the third angle is greater than the first angle threshold and less than a second angle threshold.

* * * * *